Figure 1:
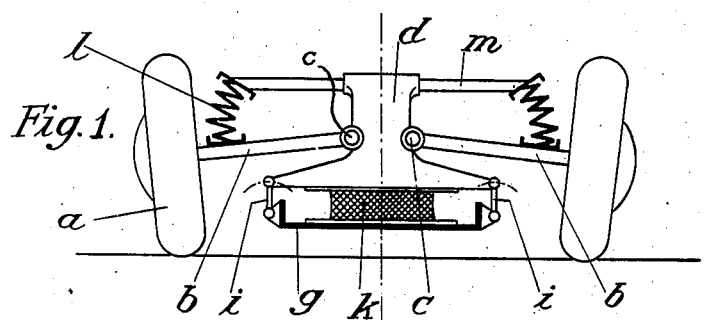

Patented June 20, 1944

2,352,053

UNITED STATES PATENT OFFICE 2,352,053

SPRINGING OF MOTOR CARS

Karl Wilfert, Sindelfingen, and Béla Barényi, Boblingen, Germany; vested in the Alien Property Custodian Application December 6, 1940, Serial No. 368,848
In Germany December 6, 1939

9 Claims. (Cl. 267—22)

This invention relates to improvements in the springing of vehicles, particularly motor cars, the wheels of which are guided by means of track-altering springing half axles, such as the so-called pendulum half-axles. Such wheels are mounted for swinging movement relatively to the frame of the vehicle, and by "frame" or "vehicle framework" when used herein is meant not only the usual vehicle frame but also other constructions which fulfill the duties of the frame as for example, a self-contained car body.

With such swinging half axles, especially pendulum half axles, with the springing of the wheels transverse forces arise at the contact point of the wheels with the road, which are transmitted by the joints by which the swinging half axles are connected with the frame onto the latter. If one of the wheels is sprung, the forces then arising tend to impart to the frame an upward motion and also a motion transverse to the riding direction, in direction toward the opposite wheel, the swinging half axle of the opposite wheel also tending to tilt to ease the vehicle over the contact point of the wheel with the road. The transverse shocks caused by these transverse motions, produce additional stresses on the frame and swinging phenomena may occur, with disturbing effects.

By the invention these drawbacks are overcome or materially lessened, the axle aggregate comprising the swinging half axles of the two wheels of the pair of wheels being arranged to yield with respect to the frame, transversely to the riding direction to an extent wholly or partially, corresponding to the track alteration of the wheels during springing. These transverse shocks produce only a transverse motion of the axle aggregate, while the frame or the vehicle framework may remain in its central position or will be influenced only slightly by the shocks.

Preferably the axle supporting piece, for instance a differential gear casing carrying the swinging half axles, is yieldingly connected with the frame, so that when yielding with respect to the frame, it moves only transversely without a rotating motion around a longitudinal axis. Additional rotating accelerations of the supporting piece are avoided.

The springing taking up the transverse motions of the axle aggregate with respect to the frame, is preferably so formed that it has an increasing springing hardness during yielding, transverse to the riding direction. The swinging half axles may be sprung either against the frame or preferably against the supporting piece. In the former case it is necessary that with the arrangement of the springs the transverse variability between the swinging half axles and the frame be taken into consideration. Unguided spiral springs may under circumstances allow such a transverse variability.

In the drawing alternate embodiments of the invention are shown by way of example.

Figure 2:
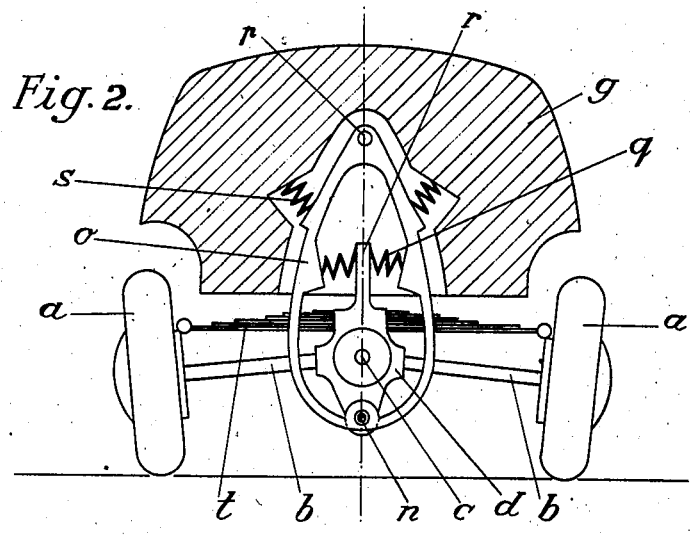

Fig. 1 is a diagrammatic view showing the rear wheels and associated parts of a vehicle equipped with one form of our improved springing arrangement mounted on a low framework and Fig. 2 is a similar view of a modified form of springing arrangement suspended from an elevated vehicle framework.

In Fig. 1 the swinging half axles $b$ carrying the wheels $a$ are jointed to a supporting piece $d$, for instance to the differential gear casing, by means of lateral joints $c$. The supporting piece $d$ is guided at the frame $g$ by the two guiding pieces or links $i$ in the form of a parallelogram in such a manner that the supporting piece is displaced about the lower joints of the guiding pieces or links $i$, but always in substantially parallel plane. For replacing the supporting piece into its central position after shocks a rubber block $k$ is utilized, which preferably is adhesively connected to the frame and to the supporting piece $d$ and is stressed during transverse displacement of the supporting piece $d$ particularly for shear. At the same time the rubber block is stressed also for compression in such a manner that with increasing lateral displacement of the supporting piece $d$ a constant increasing compression occurs, so that when subjected to strong transverse shocks a comparatively strong replacing power is produced. Simultaneously the rubber bumper acts dampingly on the transverse motions for springing the swinging half axles in vertical direction, serve the unguided spiral springs $l$ which are supported against the projections $m$ of the supporting piece $d$.

With the embodiment given by way of example in Fig. 3 the supporting piece $d$ formed as differential gear casing is journaled swingingly around a joint $n$ which is placed below the joint $c$ of the swinging half axles, arranged for instance in the central longitudinal plane. In this case the joint $n$ connects the supporting piece $d$ with the bow-shaped guiding link member $o$ which is connected swingingly to the frame $g$ or to the vehicle framework by means of an elevated joint $p$. The supporting piece $d$ is held in its central position by the springs $q$ abutting at the one side against a projection $r$ of the supporting piece $d$ and at the other side against the bow-shaped guiding member o. For the supporting of the latter relatively to the frame g the springs s are provided and they are preferably made hard in order to prevent excessive oscillation of the guiding member o. In vertical direction the swinging half axles are furthermore sprung by means of a transverse laminated spring t, secured centrally in the supporting piece d.

With transverse shocks occurring at the wheel, the axle aggregate may yield with respect to the frame in transverse direction since the guiding link member o swings pendently from the upper joint p, and the supporting piece d rocks upon the lower joint n. The motion of the supporting piece d may be a purely transverse displacement.

Generally it is not necessary that the yielding in transverse direction between the axle aggregate and the frame corresponds to the maximum track alteration. In most cases it will be sufficient if a fractional part of the track alteration will be compensated by lateral yielding. If for instance the maximum track alteration for either swinging half axle totals 10 cm., from the lowest to the highest springing of the wheel, a yielding of 2 to 3 cm. between axle aggregate and frame transverse to the riding direction will be sufficient, as normally for the unevenness of the ground only a corresponding fractional part of the spring lift will be compensated.

Having now particularly described and ascertained the nature of our invention and in what manner the same is to be performed, we declare that what we claim is:

1. In a vehicle having a frame, a pair of ground-engaging wheels, a supporting member, swinging half axles for pivotally mounting said wheels on said supporting member, means comprising a substantially vertically arranged guiding link member connecting the supporting member with the frame for guiding said supporting member relatively to said frame for substantially parallel movement in a plane perpendicular to the direction of vehicle travel when either wheel swings, and yielding means arranged between the supporting member and the framework for normally holding said supporting member in a central position relatively to said frame.

2. In a motor car a pair of vehicle wheels opposite each other, a vehicle framework, an axle carrier, means for pivotally connecting the wheels with the axle carrier in such a manner that the wheels may execute an up and down motion with respect to the axle carrier, a pair of guides consisting of two substantially vertically arranged guiding link members arranged at either side of the axle carrier and connecting the axle carrier with the vehicle framework, and said links swinging in substantially parallel planes during transverse motions of the axle carrier.

3. In a motor car the combination according to claim 2, the said guiding members being connected at their lower end with the vehicle framework and at the upper end with the axle carrier.

4. In a motor car the combination according to claim 2 with yielding means trying to keep the guiding members in a central position.

5. In a motor car the combination according to claim 2 with a rubber block between the axle carrier and the vehicle framework, so arranged that with a lateral swinging of the guiding members connecting the axle carrier with the vehicle framework, it is stressed increasingly for pressure.

6. In a motor car the combination according to claim 2 with a rubber block being so connected with the axle carrier on the one side and with the vehicle framework on the other side, that at a lateral swinging of the guiding members connecting the axle carrier with the vehicle framework, it is stressed for shearing.

7. In a motor car the combination according to claim 2 with yielding means for springing the wheels against the supporting piece.

8. In a motor car, a pair of vehicle wheels opposite to each other, a vehicle framework, an axle carrier, means for so connecting the wheels with the axle carrier that the wheels may execute an up and down motion with respect to the axle carrier, a substantially vertically arranged guiding link member connecting the axle carrier with the vehicle framework, yielding means arranged between the axle carrier and the vehicle framework tending to keep the axle carrier in a central position with respect to the vehicle framework, the said guiding member below the wheel centers being jointed with the axle carrier, and above the wheel centers being jointed with the vehicle framework.

9. In a motor car, a pair of vehicle wheels opposite to each other, a vehicle framework, an axle carrier, means for so connecting the wheels with the axle carrier that the wheels may execute an up and down motion with respect to the axle carrier, a substantially vertically arranged guiding link member connecting the axle carrier with the vehicle framework, yielding means arranged between the axle carrier and the vehicle framework tending to keep the axle carrier in a central position with respect to the vehicle framework, the said guiding member being connected at its lower end with the axle carrier, and at its upper end with the vehicle framework, and being so shaped in bow-form that it encircles the axle carrier.

KARL WILFERT.
BÉLA BARÉNYI.